United States Patent
Jeanroy et al.

(10) Patent No.: US 9,689,678 B2
(45) Date of Patent: Jun. 27, 2017

(54) MEMS BALANCED INERTIAL ANGULAR SENSOR AND METHOD FOR BALANCING SUCH A SENSOR

(71) Applicant: Safran Electronics & Defense, Boulogne Billancourt (FR)

(72) Inventors: Alain Jeanroy, Boulogne Billancourt (FR); Philippe Onfroy, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 14/787,998

(22) PCT Filed: Apr. 29, 2014

(86) PCT No.: PCT/EP2014/058687
§ 371 (c)(1),
(2) Date: Oct. 29, 2015

(87) PCT Pub. No.: WO2014/177542
PCT Pub. Date: Nov. 6, 2014

(65) Prior Publication Data
US 2016/0146606 A1 May 26, 2016

(30) Foreign Application Priority Data
Apr. 29, 2013 (FR) ...................................... 13 53926

(51) Int. Cl.
*G01C 19/5747* (2012.01)

(52) U.S. Cl.
CPC .............................. *G01C 19/5747* (2013.01)

(58) Field of Classification Search
CPC ........................ G01C 19/5747; G01C 19/5726
USPC .......................... 73/504.12, 504.14, 504.142
See application file for complete search history.

(56) References Cited

U.S. PATENT DOCUMENTS

| | | | |
|---|---|---|---|
| 6,906,849 B1 * | 6/2005 | Mi ........................ | B81B 7/0006 257/415 |
| 6,915,693 B2 * | 7/2005 | Kim .................... | G01C 19/5762 73/504.12 |
| 9,574,879 B2 * | 2/2017 | Chaumet ............ | G01C 19/5747 |
| 2004/0123661 A1 | 7/2004 | Painter et al. | |
| 2004/0149035 A1 * | 8/2004 | Acar ..................... | B81B 3/0062 73/504.12 |
| 2004/0200280 A1 * | 10/2004 | Challoner .......... | G01C 19/5719 73/504.12 |
| 2006/0032308 A1 * | 2/2006 | Acar .................. | G01C 19/5719 73/504.12 |
| 2011/0094302 A1 * | 4/2011 | Schofield ............... | G01C 19/56 73/504.12 |

(Continued)

*Primary Examiner* — Natalie Huls
*Assistant Examiner* — Monica S Young
(74) *Attorney, Agent, or Firm* — Muncy, Geissler, Olds & Lowe, P.C.

(57) ABSTRACT

The invention relates to a vibrating MEMS inertial angular sensor including a substrate for supporting at least two mass bodies mounted to bear mobile relative to the substrate and associated with at least one electrostatic actuator and at least one electrostatic detector. The sensor includes first means for suspending the mass bodies relative to the substrate and means for coupling the mass bodies together. The substrate is connected to a stationary rack by second suspension means.

16 Claims, 4 Drawing Sheets

(56) References Cited

U.S. PATENT DOCUMENTS

Figure 1:
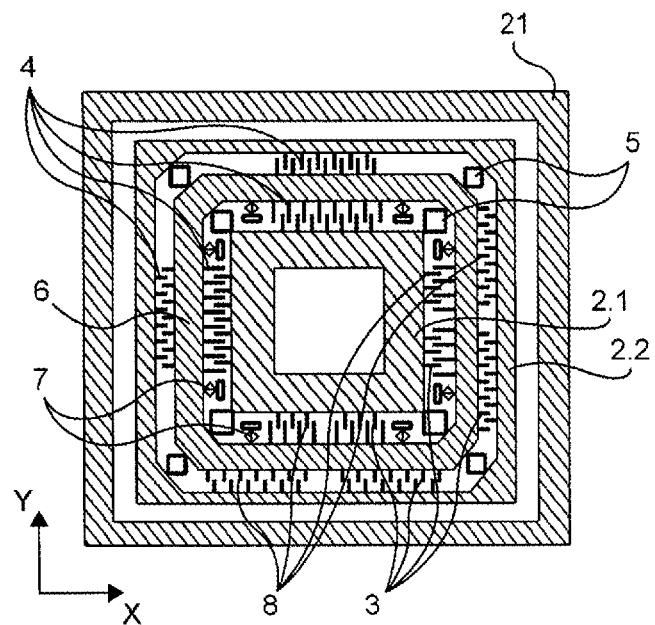

| | | | |
|---|---|---|---|
| 2013/0276536 A1* | 10/2013 | Kanemoto | G01C 19/5762 73/504.12 |
| 2013/0277775 A1* | 10/2013 | Roland | G01C 19/5747 257/415 |
| 2014/0000365 A1* | 1/2014 | Aaltonen | G01C 19/5776 73/504.12 |
| 2015/0354981 A1* | 12/2015 | Walther | G01C 19/5726 73/1.77 |

* cited by examiner

US 9,689,678 B2

MEMS BALANCED INERTIAL ANGULAR SENSOR AND METHOD FOR BALANCING SUCH A SENSOR

BACKGROUND OF THE INVENTION

The present invention relates to a vibrating inertial angular sensor such as a gyrometer or a gyroscope and a balancing method of such sensor.

The invention more specifically relates to micro-electromechanical, also called MEMS for "micro-electromechanical system" sensors. Such sensors are obtained by collective etching of a plate made of a very thin material: they are small, lightweight and relatively inexpensive, which makes it possible to use these in many fields of application, both for specialized technical products and for convenience products.

The fields of application for such sensors include the inertial measurement of angular quantities such as a position (gyroscopes) and a speed (gyrometers).

The vibrating inertial angular sensors of the MEMS type can be categorized in two families according to the resonator structure. The resonator may be a deformable body, usually of revolution: a ring, a cylinder, a hemisphere, a disk. The resonator may also consist of one or more non-deformable mass bodies (also commonly referred to as masses or test masses) connected to a substrate by elastic elements. The substrate is rigidly fixed in a rack as disclosed in US-A-2011/0094302 and US-A 2004/0123661. Each sensor comprises actuators so arranged as to vibrate the deformable resonator or the mass body/elastic elements system at the system resonance frequency and detectors detecting the deformations of the deformable resonator or the movements of the mass body/elastic elements system are mounted between the substrate and the deformable resonator on the one hand or the body mass/elastic elements system on the other hand.

The performances of any vibrating inertial sensor directly result from the stability of the damping anisotropy of the resonator. This stability is conditioned by:

- the time constant $\tau$ of the resonator (equal to the mechanical surge Q divided by $\pi$ and by the frequency f i.e. $\tau = Q/(\pi \cdot f)$, which the amount of energy that will be required to maintain the resonator in resonance depends on
- the dynamic balancing of the resonator, on the one hand, to reduce the energy losses outside of the sensor and, on the other hand, to minimize the disruptions in the vibration of the resonator caused by the vibrational environment of the sensor at the working frequency.

In the field of MEMS vibrating sensors consisting of one or more non-deformable mass bodies, this results in:

- using silicon as a material to obtain a relatively high surge,
- the presence of at least two mass bodies symmetrically mounted so that the mass bodies move in phase opposition thereby providing a first-order balancing.

The best performing MEMS vibrating angular inertial sensors thus have four mass bodies arranged in a square pattern.

The improved performances of such sensors are however limited by the sensors production defects.

Such performance defects cause a dynamic unbalance resulting from the movement of the overall centre of gravity of the mass bodies at the vibration frequency. Such dynamic unbalance causes reaction forces in the substrate and the rack, and thus a loss of energy in the vibration. This is all the more annoying since the small size of the sensors increases the impact of the production defects on the measurements accuracy. As a matter of fact, as for MEMS, the [production defect/characteristic dimensions] ratio is degraded as compared to a macroscopic sensor. This leads to a higher dynamic unbalance relative to the mass of the resonator.

The low mass of the resonator results in that it makes it difficult to measure dynamic balancing defects because the stresses generated by the unbalance are too small to be measured. Moreover, even though such measurement could be achieved, it would be difficult to correct the unbalance by locally removing material because of the small size of the sensor. Such a correction by removing material would further have the disadvantage that it would not make it possible to compensate the unbalance evolution as a function of temperature and time.

Rigidly fixing an unbalanced resonator on a significant recoil mass at the expense of sensitivity to vibration and mechanical strength is recommended.

In the case of resonators with several mass bodies, independence of the mass bodies is further achieved. The mechanical coupling allowing the first-order compensation of the movements of the mass bodies is then provided by levers connecting the mass bodies together to impart these a phase opposition motion. Producing the sensor is then complex and costly. Balancing is also made difficult by the increasing number of degrees of freedom resulting from the number of mass bodies and the number of coupling levers between the mass bodies that cause the influence on the other mass bodies of any balance correction performed on one of the mass bodies. For the same reasons, an electronic balancing by means of a correction algorithm is complex to achieve.

BRIEF SUMMARY OF THE INVENTION

The aim of the invention is to provide means for improving the accuracy of the vibrating MEMS angular inertial sensors.

For this purpose and according to the invention, a vibrating angular inertial sensor of the MEMS type is provided, which comprises a substrate with at least two mass bodies, of substantially identical masses, which are movably mounted relative to the substrate and which are associated with at least one electrostatic actuator and at least one electrostatic detector. The sensor comprises first means for suspending the mass bodies relative to the substrate and means for coupling the mass bodies together and the substrate is connected by second suspension means to a stationary rack so that the mass bodies and the substrate are mobile relative to the stationary rack parallel to a plane of suspension, with the suspension means being isotropic in the plane of suspension.

The mass bodies are thus suspended in two ways relative to the stationary rack while being mechanically coupled together. This double suspension mechanically isolates the mass bodies as regards the deformations and the vibrations generated by the rack and limits the energy exchanges between the mass bodies and the outside of the rack. This improves the performances of the sensor. The substrate is used as a mobile platform for the mass bodies, the coupling means and the suspension means associated therewith while forming a suspension stage. The actuator and the sensor are preferably each mounted between one of the mass bodies and the substrate so that the substrate is also used here as a mobile platform for the actuator and the detector.

According to a first embodiment, the first suspension means comprise a frame which the mass bodies are connected to by third suspension means to provide a mass coupling of the mass bodies together, and the frame is itself connected by fourth means for suspending the substrate.

Thus, the direct mechanical coupling between the mass bodies is not provided by levers which, as seen above, make the manufacture and balancing of the sensor more difficult. As a matter of fact, the mechanical coupling between the mass bodies is provided in this embodiment by the suspended frame, which simplifies the structure of the sensor and the balancing thereof.

According to a second embodiment, the coupling means comprise fifth suspension means connecting the mass bodies together to provide an elastic coupling of the mass bodies together.

Thus, the direct mechanical coupling through levers between the mass bodies is here eliminated too. As a matter of fact, the mechanical coupling between the mass bodies is provided, in this embodiment, by the fifth suspension means, which simplifies the structure of the sensor.

Preferably, at least one unbalance effect detector is mounted between the substrate and the stationary rack and at least one electrostatic spring is positioned between the substrate and one of the mass bodies and is servo-controlled so as to provide a dynamic balancing of the sensor according to a measurement signal from the unbalance effect detector.

Balancing can be achieved with this structure by measuring the anisotropy (or difference) in frequency between the two mass body/suspension systems and by eliminating such anisotropy. The measurement of anisotropy can be indirectly performed by measuring the effect of the unbalance created by the frequency anisotropy. The balance correction is preferably carried out by controlling the electrostatic spring to add a negative electrostatic stiffness to the stiffness of the mass body/suspension system having the highest frequency so as to correct the pulse intrinsic deviation due to production defects and to time and thermal changes in the parameters of each one of the mass body/suspension systems. Adjustment, based on a zero control, does not require accurate voltage reference or steady gains at the sensor processing electronics.

The invention also relates to a method for balancing such sensor.

Other characteristics and advantages of the invention will become apparent upon reading the following description of particular non-restrictive embodiments of the invention.

BRIEF DESCRIPTION OF THE SEVERAL VIEWS OF THE DRAWING(S)

Figure 2:
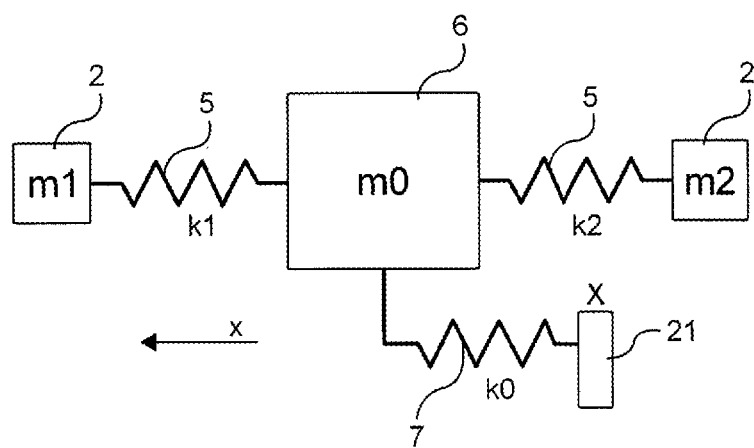
Figure 3:
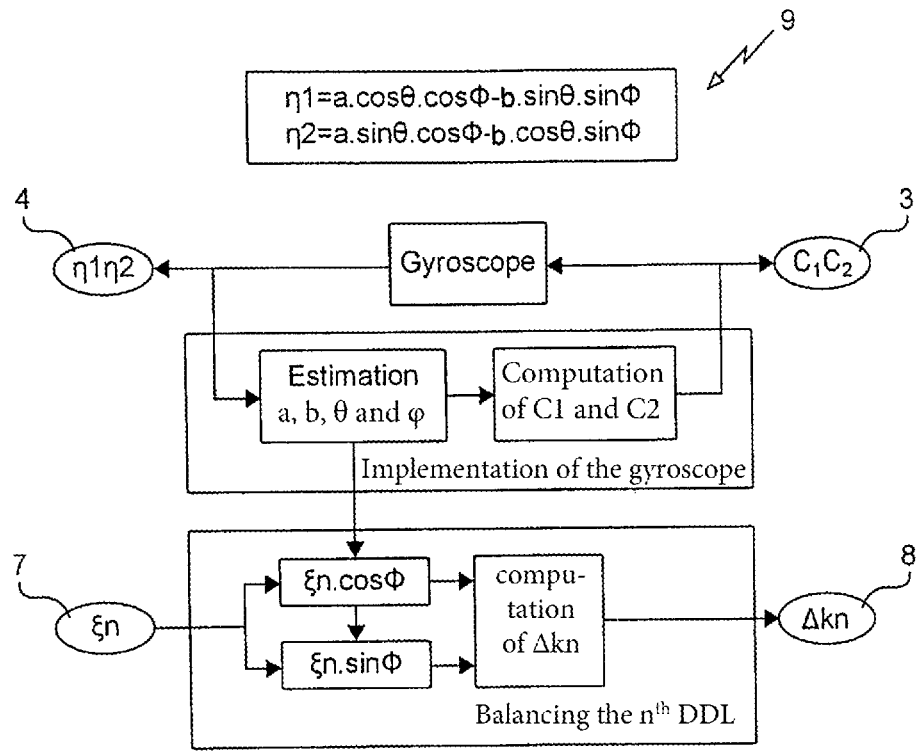
Figure 3:
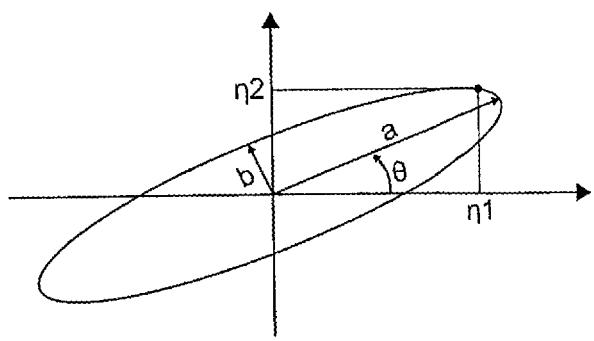
Figure 4:
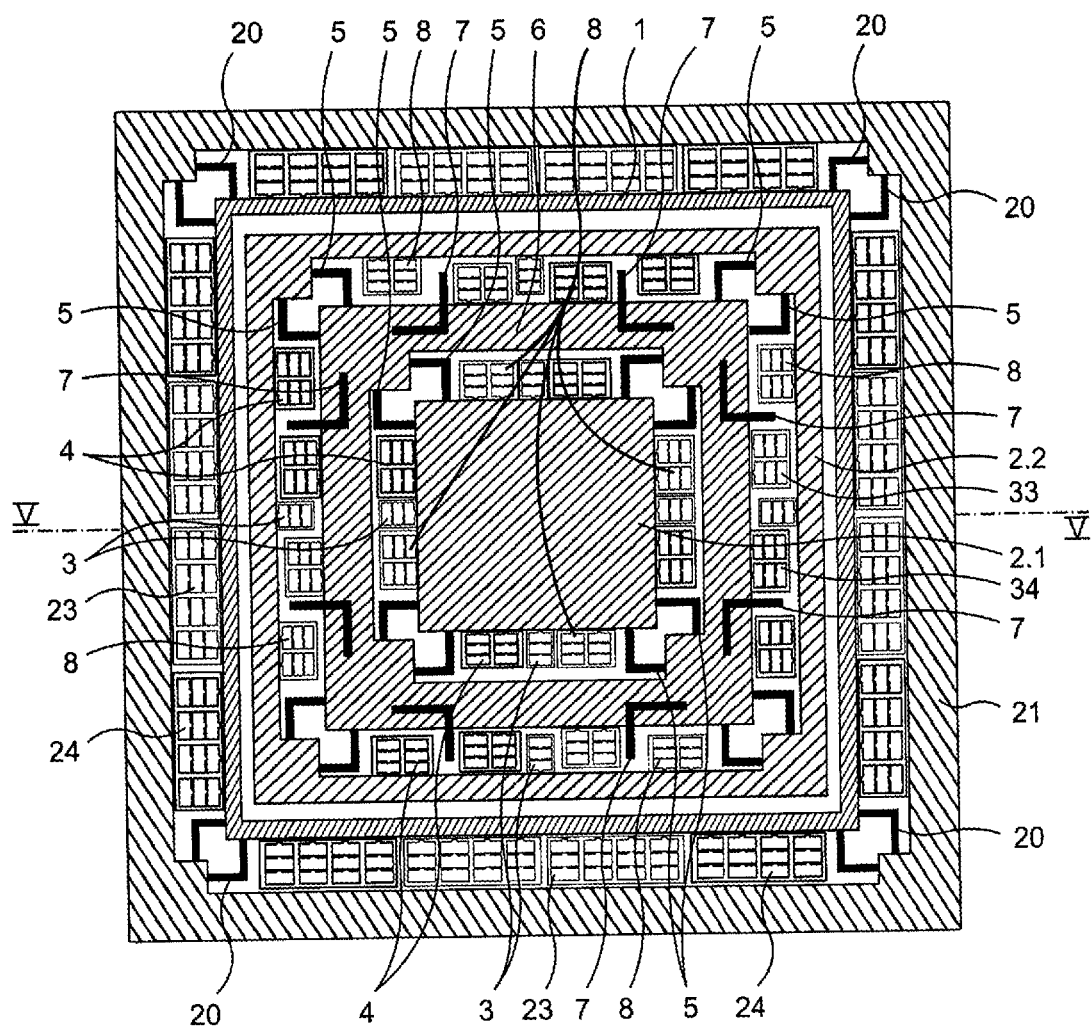
Figure 5:
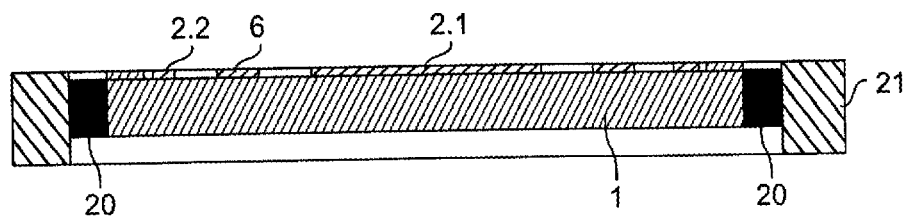
Figure 6:
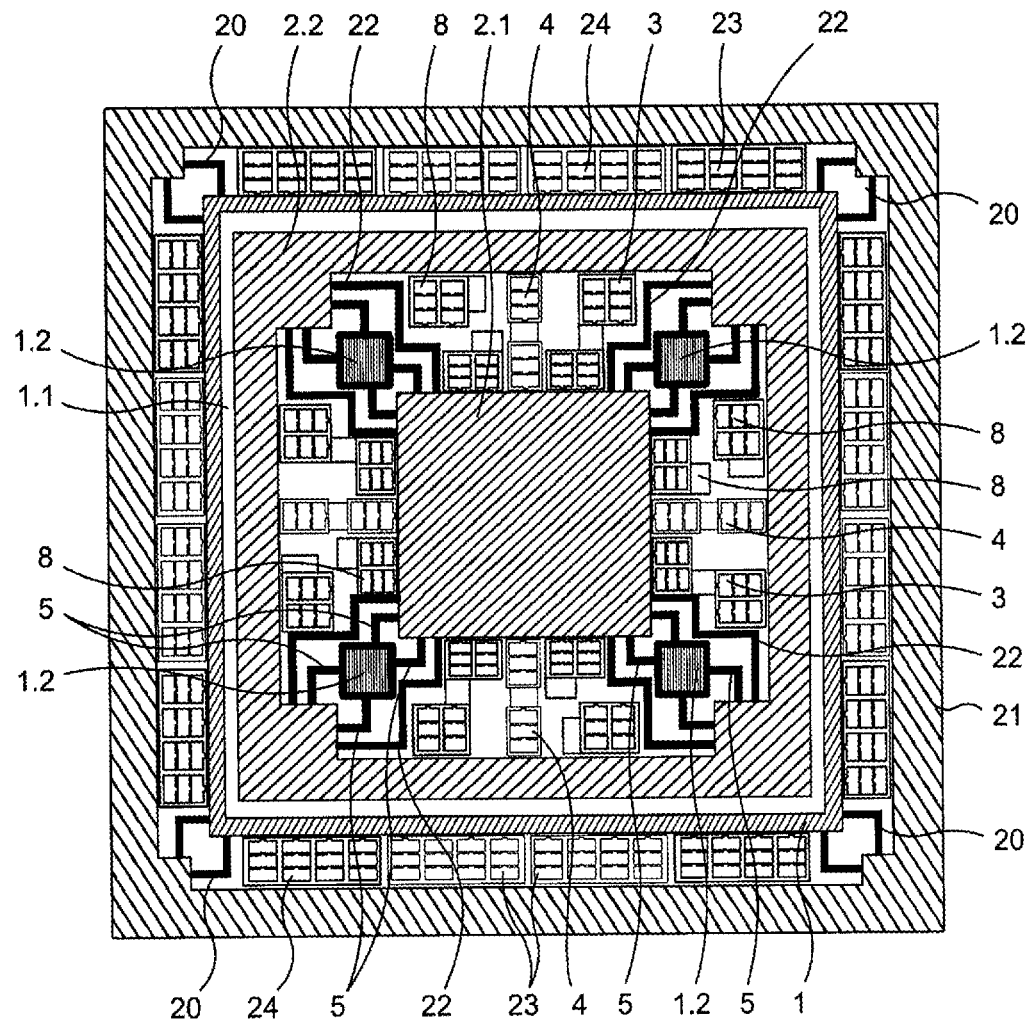

Reference is made to the appended drawings, wherein:
FIGS. 1-3 are used to explain the principle of the invention, i.e.
FIG. 1 is a schematic view of a simplified sensor implementing a part of the means of the invention,
FIG. 2 is a schematic view illustrating the operation principle of this sensor,
FIG. 3 is a schematic view of one embodiment of such sensor control unit,
FIGS. 4-6 are used to describe the embodiments of the invention, i.e.
FIG. 4 is a schematic view of a first embodiment of the sensor of the invention,
FIG. 5 is a sectional view of the sensor along the line V-V of FIG. 4,
FIG. 6 is a schematic view of a second embodiment of the sensor of the invention.

Referring to the figures, the invention relates to a vibrating inertial angular sensor of the MEMS type intended to form a gyroscope or a gyrometer.

DETAILED DESCRIPTION OF THE INVENTION

The principle of the invention will now be explained with reference to FIGS. 1 to 3.

The simplified sensor illustrated in these figures comprises a rack 21 and at least two mass bodies 2 which are mounted to be mobile relative to the rack 21 and which are associated with electrostatic actuators 3 and to electrostatic detectors 4.

For this simplified sensor, the substrate which is used as a platform for the mass bodies and the suspension means associated therewith, while forming a suspension stage, is also used as a frame for the mass coupling of the mass bodies. The actuator and the detector are each mounted between one of the mass bodies and the frame so that the coupling frame is also used here as a platform for the actuator and the detector instead of the substrate.

The mass bodies 2 are suspended via suspension means 5 in a frame 6 itself connected to the rack 21 by suspension means 7. The suspension means 7 are isotropic in the XY plane that defines the plane of suspension of the mass bodies of the sensor and are made to have a significant stiffness along the axis normal to the plane of the sensor to eliminate the degrees of freedom of the mass bodies 2 and of the frame 6 out of the plane. Each mass body 2 and the frame 6 have three degrees of freedom in the plane, i.e. two translations (along the X and Y axes) and one rotation (about an axis normal to the X and Y plane).

For each of the X and Y axes, an actuator 3 and a detector 4 are mounted between each of the mass bodies 2 and the frame 6. The actuators 3 and the sensors 4 have a known structure in the form of comb electrodes the teeth of which are interleaved. The combs of the actuators 3 and the detectors 4 may have an operation mode with a variable gap or a variable surface.

The mass bodies 2 have identical masses and have a generally square shape on the sides of which the actuators 3 and 4 are arranged. The suspension means 5 are arranged at the top of each mass body 2. The mass bodies 2.1, 2.2 are two in number and are so arranged as to be concentrically fixed. More specifically, the frame 6 has a square shape and the mass bodies 2.1, 2.2, having a frame shape with a square contour are positioned on either side of the frame 6. The mass bodies 2.1, 2.2 have merged axes of symmetry having identical proper frequencies.

Two electrostatic springs 8 are mounted between the frame 6 and each of the mass bodies 2 so as to act along the axes X and Y respectively. The electrostatic springs 8 have a known structure in the form of comb electrodes the teeth of which are interleaved. The combs of the electrostatic springs 8 have an operation mode with a variable air gap.

Unbalance effect detectors here more particularly force sensors, are integrated in the suspension means 7 for supplying a measurement signal representative of the stresses transmitted to the rack 21 by the frame 6. These sensors are known per se and may be piezo-electric or piezo-resistive constraint gauges.

The sensor of the invention is manufactured from conventional techniques for etching semiconductor material plates. The semiconductor material used here is silicon.

The actuators 3 and the sensors 4 are connected by electrical conductors known per se, to a control unit 9, also known per se, which is programmed to control the actuators 3 and process the signals of the detectors 4 so as to ensure the detection of the angular quantity about an axis normal to the plane of motion of the mass bodies 2.

The electrostatic spring 8 and the force sensors integrated in the suspension means 7 are also connected to the control unit 9 which is programmed for controlling the electrostatic springs 8 according to the signals of said force sensors demodulated according to the frequency of vibration of the mass bodies 2 to eliminate the unbalance at the vibration frequency so as to ensure a balancing of the sensor.

The operation of the control unit 9 is shown in FIG. 3 in determining the stiffness variation $\Delta kn$ for balancing the sensor according to a degree of freedom "n". An elliptical vibration of a large dimension "a" and a small dimension "b" is symbolized thereon. The major axis of vibration forms an angle $\theta$ in a XY coordinate system. The implementation of the gyroscope leads to the determination of the commands C1 and C2 of the actuators 3 according to the movements $\eta 1$, $\eta 2$ detected by the sensors 4. Knowing that the values $\eta 1 = a \cdot \cos \theta \cos \phi + b \cdot \sin \theta \sin \phi$ and $\eta 2 = a \cdot \sin \theta \sin \phi + b \cdot \cos \theta \cos \phi$, an estimate of a, b, $\theta$ and $\phi$ can be deduced therefrom. Knowing the stresses $\xi \eta$ detected by the sensors 7, the control unit computes the values $\xi n \cdot \cos \phi$ and $\xi n \cdot \sin \phi$ to reach the stiffness variation $\Delta kn$ to be used as the set value to control the electrostatic springs 8.

It should be reminded here that the masses $(m_1, m_2)$ of the mass bodies 2.1, 2.2 are identical and that the suspension means of the mass bodies 2.1, 2.2 have identical stiffness $(k_1, k_2)$. This makes it possible to check the assumptions of the dynamic modelling equations presented hereunder.

With particular reference to FIG. 2, the sensor is comparable to two mass/spring systems $(m_1, k_1)$ and $(m_2, k_2)$ connected to the outside by another mass/spring system $(m_0, k_0)$, i.e. the mass of the frame 6 and the stiffness of the suspension means 7).

The behaviour of the sensor can be modelled using the following data ($\delta m$ and $\delta k$ are noted respectively for a difference in mass and a difference in stiffness):

$$m1:=m\cdot(1+\delta m); m2:=m\cdot(1-\delta m); k1:=k\cdot(1+\delta k); k2:=k\cdot(1-\delta k); m0:=\beta\cdot m; k0:=\alpha\cdot k; k:=\omega^2\cdot m;$$

Modelling makes it possible to compute the frequencies of the natural modes, the unbalance of the useful normal mode and the reaction force of such unbalance on the substrate.

The result is that the unbalance is proportional to the mass m, the ratio k0/k noted $\alpha$ and the difference in pulse $\delta \omega$ of the two mass/spring systems. The unbalance of the useful mode is as follows:

$$\text{unbalance} = 2m\alpha\delta\omega$$

The force transmitted to the outside can be expressed in the same way:

$$\text{force} = 2k\alpha\delta\omega$$

It appears from the above formulas that balancing of the sensor can be achieved, according to the invention using the following steps:
  measuring a frequency anisotropy between the masses, with the measurement step being performed by measuring the stress applied by the frame to the rack due to the unbalance of the sensor resulting from the production defects,
  correcting the frequency anisotropy between the masses. The step of correcting is performed by controlling the electrostatic springs 8 so as to reduce this effect: a servo-control operating the demodulation relative to the frequency of the vibration of the signals from the force sensors integrated in the suspension means 7 corrects the stiffness of the electrostatic springs 8 positioned between the mass bodies 2 and the frame 6 to eliminate the unbalance at the vibration frequency.

The correction is executed with a greater accuracy here by adding a negative electrostatic stiffness to the stiffness of the mass/spring system having the highest frequency to correct the intrinsic pulse deviation resulting from the production defects and the time and thermal changes in the parameters of each one of the mass/spring systems.

It should be noted that the arrangement of the sensor makes it possible to obtain two normal modes along the X axis, i.e. masses m1 and m2 moving in phase and the masses m1 and m2 moving in phase opposition, with a small displacement of the mass m0, which do not have the same frequencies. The difference in frequency is for example of the order of 10% if m0=10*m1/2 or 25% if m0=4*m1/2. This confirms the possibility of simplifying the structure, by using no mechanical coupling levers between the masses, without any risk of collision between the two normal modes during operation.

It is thus possible to make a closed loop gyrometer with two vibrating mass bodies, with a servo-control at 0 on the Coriolis path Y. This makes it possible to use an unbalanced normal mode of the first order for this path.

In the embodiments of the invention which will now be described, the substrate is connected to a rack by suspension means.

In these embodiments, two types of coupling are provided between the mass bodies:
  a mass coupling, wherein the two mass bodies are fixed by springs on a coupling mass (the frame) suspended relative to the substrate,
  a spring coupling, wherein the two mass bodies are suspended relative to the substrate and are directly connected together by coupling springs (or suspension).

A coupling coefficient as the ratio between the frequency of the phase translation mode of the mass bodies and the frequency of the translation mode in phase opposition of the mass bodies are defined as follows:
  a=1: no coupling,
  a=0: total coupling.

In the case of mass coupling, the coupling coefficient depends on the ratio (mass of the mass bodies 2/mass of the frame), In the case of spring coupling, the coupling coefficient depends on the ratio (spring stiffness between the mass bodies/stiffness of the springs between the mass bodies and the substrate).

The coupling is minimum when the coefficient tends to 1, i.e. when the mass of the frame is high or when the stiffness of the springs between the mass bodies is low and is all the stronger since the coupling coefficient is close to 0, i.e. when the mass of the frame is low or when the stiffness of the springs between the mass bodies is high.

Referring to FIGS. 4 to 6, the sensor according to the embodiments of the invention comprises a substrate 1 and at least two mass bodies 2 which are mounted to be mobile relative to the substrate 1 and which are associated with electrostatic actuators 3 and electrostatic detectors 4. The mass bodies 2.1, 2.2 are two in number and are so arranged as to be concentrically mounted.

The mass bodies 2.1, 2.2 thus respectively have a square shape and a shape of a frame of combined axes of symmetry with identical proper frequencies.

The sensor comprises first means for suspending the mass bodies 2.1, 2.2 to the substrate 1 and the means for coupling the mass bodies 2.1, 2.2 together.

The masses of the mass bodies 2.1, 2.2 are identical, and the means for suspending the mass bodies 2.1, 2.2 have identical stiffness. This makes it possible to comply with the assumptions of the dynamic modelling equations presented above.

Referring more particularly to FIGS. 4 and 5, according to the first improved embodiment, the mass bodies 2.1, 2.2 are arranged on either side of a frame 6 having a square shape.

The mass bodies 2.1, 2.2 are suspended via suspension means 5 to the frame 6 itself connected to the substrate 1 by suspension means 7. The suspension means and 7 are isotropic in the XY plane defining the suspension plane of the mass bodies 2.1, 2.2 of the sensor and are provided with a significant stiffness along the axis normal to the plane of the sensor to eliminate the degrees of freedom of the mass bodies 2.1, 2.2 and 6 of the frame out of the plane. Each mass body 2.1, 2.2 and the frame 6 have three degrees of freedom in the plane, i.e. two translations (along the X and Y axes) and one rotation (about an axis normal to the X and Y plane).

The frame 6 thus connected to the mass bodies 2.1, 2.2 by the suspension means provides a mass coupling of the mass bodies 2.1 and 2.2 together. The frame 6 is here relatively light as compared to the mass bodies so that the coupling is strong (a coupling coefficient between 0.2 and 0.4, preferably 0.3 for instance). A strong coupling has the advantage of getting away from the frequency of the vibration useful mode of the mass bodies (the mass bodies vibrate in phase opposition in the plane of suspension in any orientation relative to the substrate 1) the frequency of the vibration spurious mode (the mass bodies vibrate in phase), which then get closer to the frequency of the suspension mode (general mode of the substrate 1 and the mass bodies 2). The strong coupling provides a high surge limiting the energy dissipation of the useful mode.

For each of the X and Y axes, an actuator 3 and a detector 4 are mounted between each of the mass bodies 2 and the substrate 1. The actuators 3 and the sensors 4 have a known structure in the form of comb electrodes the teeth of which are interleaved. Combs are thus fixed to the mass bodies 2 and combs are fixed to the substrate 1. The combs of the actuators 3 and the detectors 4 may have an operation mode with a variable gap or a variable surface. The actuators 3 and the sensors 4 are arranged on the sides of the mass bodies 2.1, 2.2 and the suspension means 5 are arranged at the top of each mass body 2.1, 2.2.

Four electrostatic springs 8 are mounted between the substrate 1 and each one of the mass bodies 2.1, 2.2 so as to act respectively along the X and Y axes. The electrostatic springs 8 have a known structure in the form of comb electrodes the teeth of which are interleaved. Combs are thus fixed to the mass bodies 2 and combs are fixed to the substrate 1. The combs of the electrostatic springs 8 have an operation mode with a variable air gap.

The substrate 1 in the form of a platform bordered by a rim, is connected by second suspension means 20 to a stationary rack 21. The suspension means 20 are designed like the suspension means 5 and 7 and are mounted at the top of the substrate 1. The suspension means 20 are isotropic in the XY plane defining the suspension plane of the mass bodies 2.1, 2.2 of the sensor and are made to have a significant stiffness along the axis normal to the plane of the sensor to eliminate the degrees of freedom of the substrate 1 out of the plane. The substrate 1 has three degrees of freedom in the plane, i.e. two translations (along the X and Y axes) and one rotation (about an axis normal to the X and Y plane).

For each of the X and Y axes, actuators 23 and unbalance effects detectors 24 are mounted between the rack 21 and the substrate 1. The actuators 23 and the sensors 24 have a known structure in the form of comb electrodes the teeth of which are interleaved. Combs are thus fixed to the rack 21 and combs are fixed to the substrate 1. The combs of the actuators 23 and the detectors 24 may have an operation mode with a variable gap or a variable surface. The actuators 23 and the sensors 24 are arranged on the sides of the rack 21 and the substrate 1.

Alternately, unbalance effect detectors here more particularly force sensors, are integrated in the suspension means 20 for providing a measurement signal representative of the stresses transmitted to the rack 21 by the substrate 1. These sensors are known per se and may be piezo-electric or piezo-resistive constraint gauges.

The sensor of the invention is manufactured using conventional techniques for etching semiconductor material plates (DRIE etching on SOI silicon wafer for example). The semiconductor material used here is silicon.

The actuators 3 and the detectors 4 are connected by electrical conductors known per se, to the control unit, also known per se, which is programmed to control the actuators 3 and process the signals from the detectors 4 so as to provide the detection of the angular quantity about an axis normal to the plane of motion of the mass bodies 2.1, 2.2.

The electrostatic springs 8 and the detectors of unbalance effects 24 providing a measurement signal representative of the stresses transmitted to the rack 21 by the substrate 1 are also connected to the control unit which is programmed for servo-controlling the electrostatic springs 8 according to the signals from said detectors 24 demodulated as a function of the vibration frequency of the mass bodies 2.1, 2.2 to eliminate the unbalance at the vibration frequency so as to ensure a balancing of the sensor. Controlling the electrostatic springs 8 thus makes it possible to adjust the elementary stiffness of each mass body 2, i.e. the stiffness participating in the same normal mode to cancel the unbalance of such normal mode and the average stiffness of each one of the two normal modes to cancel the quadrature or anisofrequency defect conventionally met. This control is performed in order to obtain four elementary vibration frequencies (one elementary frequency per axis for each mass body 2) which are equal.

The actuators 23 and the detectors 24 are connected to the control unit which is programmed to control the actuators 23 according to the signals from said detectors to provide 24 active damping, known per se, of the suspension 20 of the substrate 1.

There are no electrodes between the frame 6 and the mass bodies 2.1 and 2.2, which simplifies the manufacture of the sensor. The frame 6 therefore only provides a coupling function while the substrate 1 also further provides a function of electrode holder for the mass bodies 2.1 and 2.2.

Referring to FIG. 6, according to the second embodiment, the substrate 1 comprises a platform 1.1 and pads 1.2 projecting from the platform 1.1 between the mass bodies 2.1, 2.2. The mass bodies 2.1, 2.2 are connected to the pads 1.2 by the suspension means 5.

Suspension means 22 connecting the mass bodies 2.1, 2.2 together are means for resiliently coupling the mass bodies 2.1, 2.2 together. The suspension means 22 preferably have a stiffness greater than the stiffness of the suspension means 5 so that the coupling is strong (for example with a coupling coefficient between 0.2 and 0.4, preferably 0.3). As indicated above, a strong coupling has the advantage of getting away from the frequency of the vibration useful mode of the mass bodies (the mass bodies vibrate in phase opposition in any orientation relative to the substrate 1) the frequency of the vibration spurious mode (the mass bodies vibrate in phase), which then gets closer to the frequency of the suspension mode (general mode of the substrate 1 and the mass bodies 2). The strong coupling provides a high surge limiting the energy dissipation of the useful mode.

As above, the substrate 1 is connected to the stationary rack 21 by suspension means 20.

Actuators 23 are mounted between the rack 21 and the substrate 1. Unbalance effect detectors 24 are mounted between the rack 21 and the substrate 1 to provide a measurement signal representative of the stresses transmitted to the rack 21 by the substrate 1.

The actuators 3, 23, and the detectors 4, 24 and the electrostatic springs 8 are connected to the control unit by electrical conductors known per se, as in the first embodiment.

The control method and the operation of the improved embodiments are similar to those discussed in connection with the embodiments of FIGS. 1 to 5.

Of course, the invention is not limited to the described embodiments but encompasses any alternative solution within the scope of the invention as defined in the claims.

Servo-controlled electrostatic springs may be provided on all the mass bodies 2 or on all the mass bodies 2 except one.

The effect of the measured unbalance may be a stress applied by the substrate 1 to the rack 21, an acceleration of the substrate 1 relative to the rack 21, a speed of the substrate 1 relative to the rack 21, a motion of the substrate 1 relative to the rack 21 or the like.

The sensor may have a shape different from the one described. The mass bodies and the frame may have, in the sensor plane, polygonal or at least partly curved shapes, which can be described by four 90° rotations of a pattern representing a quarter of the geometry.

At least one electrostatic actuator 33 and at least one electrostatic detector 34 can be positioned between the frame 6 and the substrate 1 to achieve active damping, known per se, of the suspension 7 of the frame 6.

The invention also relates to a sensor the mass bodies of which would be suspended on a substrate and would have a strong coupling through a mass or a spring and which would not be provided with active balancing means described in connection with the embodiment shown in the figures. Depending on the quality of the construction and the real defects of stiffness anisotropy, eliminating the unbalance setting means may be considered, with the double suspension limiting the influence of unbalance on the measurements.

The invention claimed is:

1. A vibrating inertial angular sensor of the MEMS type comprising a substrate for supporting at least two mass bodies having substantially the same mass, which are mounted to be mobile in a plane of suspension relative to the substrate and which are associated with at least one electrostatic actuator and at least one electrostatic detector, the sensor comprising first means for suspending the mass bodies relative to the substrate and means for coupling the mass bodies together, and the substrate being connected to a stationary rack by second suspension means, so that the mass bodies and the substrate are mobile relative to the stationary rack parallel to the plane of suspension, with the suspension means being isotropic in the plane of suspension.

2. The sensor according to claim 1, wherein the means for coupling the mass bodies together are so arranged as to provide a strong coupling.

3. The sensor according to claim 2, wherein the mass bodies are so arranged as to be concentrically mounted one around the other.

4. The sensor according to claim 3, wherein a frame is mounted between the mass bodies and connected to the mass bodies by third suspension means for providing a mass coupling of the mass bodies together, with the frame being itself connected by fourth means for suspending to the substrate; with the frame, the third suspension means and the fourth suspension means forming the first suspension means; with the frame and the third suspension means forming the coupling means.

5. The sensor according to claim 4, wherein the stationary rack extends around the substrate and the second suspension means connect a periphery of the substrate to the stationary rack.

6. The sensor according to claim 3, wherein the substrate comprises a platform and pads projecting from the platform between the mass bodies, with the mass bodies being connected to the pads by the first suspension means and the coupling means comprise suspension means connecting the mass bodies together.

7. The sensor according to claim 6, wherein the stationary rack extends around the substrate and the second suspension means connect a periphery of the substrate to the stationary rack.

8. The sensor according to claim 1, wherein the first suspension means comprise a frame which the mass bodies are connected to by third suspension means so as to provide a mass coupling of the mass bodies together and which is itself connected by fourth means for suspending the bodies to the substrate.

9. The sensor according to claim 1, wherein the means for coupling the mass bodies together comprise fifth suspension means connecting the mass bodies together to provide an elastic coupling of the mass bodies together.

10. The sensor according to claim 1, wherein at least one unbalance effect detector is mounted between the substrate and the stationary rack and at least one electrostatic spring is positioned between the substrate and one of the mass bodies and is servo-controlled so as to provide a dynamic balancing of the sensor according to a measurement signal from the unbalance effect detector.

11. A method for balancing the sensor according to claim 10, comprising the steps of measuring and correcting a frequency anisotropy between the mass bodies due to production defects, with the step of measuring being performed by measuring an effect produced by the unbalance of the sensor resulting from the frequency anisotropy and the step of correcting being performed by servo-controlling the electrostatic spring control so as to reduce such effect.

12. The method according to claim 11, wherein the effect of the measured unbalance is a stress applied by the substrate to the stationary rack.

13. The method according to claim 11, wherein the effect of the measured unbalance is an acceleration of the substrate relative to the stationary rack.

14. The method according to claim 11, wherein the effect of the measured unbalance is a speed of the substrate relative to the stationary rack.

15. The method according to claim 11, wherein the effect of the measured unbalance is a motion of the substrate relative to the stationary rack.

16. The sensor according to claim 1, wherein the electrostatic actuator and the electrostatic detector are each mounted between one of the mass bodies and the substrate.

* * * * *